(12) United States Patent
Maeda

(10) Patent No.: US 12,191,438 B2
(45) Date of Patent: Jan. 7, 2025

(54) METHOD FOR PRODUCING A POWER STORAGE DEVICE

(71) Applicant: Prime Planet Energy & Solutions, Inc., Tokyo (JP)

(72) Inventor: Tomonori Maeda, Kobe (JP)

(73) Assignee: PRIME PLANET ENERGY & SOLUTIONS, INC., Tokyo (JP)

(*) Notice: Subject to any disclaimer, the term of this patent is extended or adjusted under 35 U.S.C. 154(b) by 279 days.

(21) Appl. No.: 18/063,688

(22) Filed: Dec. 9, 2022

(65) Prior Publication Data
US 2023/0307692 A1   Sep. 28, 2023

(30) Foreign Application Priority Data
Mar. 23, 2022  (JP) ................................ 2022-047391

(51) Int. Cl.
  *H01M 10/04*  (2006.01)
  *H01M 50/183*  (2021.01)

(52) U.S. Cl.
  CPC ..... *H01M 10/0481* (2013.01); *H01M 50/183* (2021.01)

(58) Field of Classification Search
  CPC ........... B32B 2457/10; B32B 2457/18; H01M 10/04; H01M 10/0404; H01M 10/0413; H01M 10/0431; H01M 10/0436; H01M 10/045; H01M 10/0468; H01M 10/0481; H01M 10/049; H01M 10/0525; H01M 10/058; H01M 10/0585; H01M 50/183; H01M 50/184; H01M 50/186; H01M 50/30; H01M 50/308; Y02E 60/10; Y02P 70/50

See application file for complete search history.

(56) References Cited

U.S. PATENT DOCUMENTS

| | | | |
|---|---|---|---|
| 2021/0184244 A1* | 6/2021 | Taniuchi | H01M 50/102 |
| 2023/0420724 A1* | 12/2023 | Kang | H01M 10/446 |

FOREIGN PATENT DOCUMENTS

| | | | |
|---|---|---|---|
| JP | 201080105 A | | 4/2010 |
| JP | 201393122 A | | 5/2013 |
| JP | 2013093122 A | * | 5/2013 |
| JP | 2015-228288 A | | 12/2015 |
| JP | 2018-163858 A | | 10/2018 |

* cited by examiner

*Primary Examiner* — Michael A Tolin
(74) *Attorney, Agent, or Firm* — HAUPTMAN HAM, LLP

(57) ABSTRACT

A method for producing a power storage device includes: compressively deforming in which case long-side walls of the power storage device after initial charging and aging but before permanent sealing are pressed toward an electrode body to compress the electrode body and further plastically deform at least one of the case long-side walls so that the case long-side walls continue to press the electrode body even after the pressing is released; after this compressively deforming, hermetically permanently sealing the case of the power storage device in which the inside of the case is in communication with the outside; and releasing the pressing applied in the compressively deforming.

8 Claims, 5 Drawing Sheets

METHOD FOR PRODUCING A POWER STORAGE DEVICE

CROSS-REFERENCE TO RELATED APPLICATIONS

This application is based upon and claims the benefit of priority to Japanese Patent Application No. 2022-047391 filed on Mar. 23, 2022, the entire contents of which are incorporated herein by reference.

BACKGROUND

Technical Field

The present disclosure relates to a method for producing a power storage device in which an electrode body and an electrolytic solution are accommodated in a case.

Related Art

As a method for producing a battery having a flat parallelepiped box-shaped case in which an electrode body and an electrolytic solution are accommodated, for example, the following production method has been known. Specifically, a battery with an electrode body housed in a case is assembled first and then an electrolytic solution is injected into the case. This assembled battery is subsequently clamped with an external compression tool in a thickness direction of the battery and further pressed in the thickness direction. Accordingly, the electrode body in the battery is compressed in the thickness direction and also a pair of case side walls of the case are plastically deformed to be recessed toward the electrode body. While the battery is remains pressed with the compression tool, the case is hermetically sealed. This battery is then subjected to initial charging and successively aging to complete the battery. A related art to the above-mentioned production method is disclosed for example in Japanese unexamined patent application publication No. 2013-093122.

SUMMARY

Technical Problems

However, during the initial charging and the aging of the battery, a part of the electrolytic solution is decomposed inside the electrode body, generating gas. In the foregoing production method, the initial charging and the aging are performed after the case is plastically deformed and sealed, so that the gas generated in the electrode body during the initial charging and the aging could not be sufficiently discharged out of the electrode body. Even the gas discharged out of the electrode body could not be exhausted out of the case and remains staying in the case. As a result, the internal pressure on the battery after the initial charging and others rises and the pressing force of the pair of case side walls against the electrode body weakens. Thus, if gas is generated in the electrode body during use of a battery after shipment, the gas is apt to accumulate inside the electrode body.

The present disclosure has been made to address the above problems and has a purpose to provide a method for producing a power storage device, in which an electrode body of a completed power storage device has little gas accumulating therein and further, even if gas is generated in the electrode body during use of the power storage device, the gas is less likely to accumulate in the electrode body.

Means of Solving the Problems

To achieve the above-mentioned purpose, one aspect of the present disclosure provides (1) a method for producing a power storage device, the power storage device comprising: an electrode body having a pair of electrode body flat surfaces and including a plurality of electrode sheets laminated in a thickness direction perpendicular to an extending direction of the flat surfaces; an electrolytic solution; a case that has a pair of case side walls each facing one of the electrode flat surfaces and accommodates the electrode body and the electrolytic solution, wherein the method comprises: (a) compressively deforming including pressing the pair of case side walls of the case against the electrode body after the power storage device is subjected to initial charging and aging but before permanent sealing, to: compress the electrode body interposed between the pair of case side walls in the thickness direction; and plastically deform at least one of the pair of case side walls to be recessed toward the electrode body so that the pair of case side walls continue to press the electrode body in the thickness direction even after releasing the pressing; after the compressively deforming, (b) hermetically permanently sealing the case of the power storage device in which inside of the case is in communication with outside; and (c) releasing the pressing on the power storage device applied in the compressively deforming.

In the above-described production method, the compressively deforming is performed on the power storage device having been subjected to the initial charging and the aging but not been permanently sealed yet. After that, while the power storage device is kept pressed as in the compressively deforming, or alternatively, while the power storage device has been subjected to the releasing to release the pressing applied in the compressively deforming, but keeps the case (i.e., the pair of case side walls) pressing by themselves against the electrode body, which will be referred to as "self-pressing", the case whose inside is in communication with the outside is sealed so as to disable unsealing, that is, the case is permanently sealed (in the permanently sealing). Therefore, the case can be hermetically, permanently sealed in such a state where the gas generated by decomposition of the electrolytic solution in the electrode body during the initial charging and aging has been pushed out of the electrode body and further exhausted out of the case. This method can therefore produce a power storage device with little gas accumulating in the electrode body. In addition, since the completed power storage device continues the self-pressing by pressing the case itself against the electrode body, even if gas is generated in the electrode body during use of the power storage device after shipment, this gas is easily discharged out of the electrode body by the pressing and hence the gas is less likely to accumulate in the The power storage device may include for example a secondary battery, such as a lithium-ion secondary battery, a capacitor, such as a lithium-ion capacitor, and others.

The electrode body including the electrode sheets laminated in the thickness direction may include for example a flat wound electrode body in which strip-shaped electrode sheets and strip-shaped separators are wound in a flat shape so that the electrode sheets are laminated in the thickness direction of the electrode body, a laminated electrode body in which a plurality of sheet-shaped electrode sheets are laminated, or stacked, in the thickness direction with separators interposed therebetween. Further, the power storage device may be provided with a single electrode body or a plurality of electrode bodies.

The compressively deforming may be performed on a power storage device in which the inside of the case is in communication with the outside, that is, the case is unsealed, or alternatively, on a power storage device with the case temporarily sealed. In the process of producing the power storage device, when the aging is performed twice or more, it is especially preferable to perform the compressively deforming on a power storage device after the last aging. This is because gas may be generated due to decomposition of the electrolytic solution in the electrode body even during the second and subsequent initial-charging operations and during the second and subsequent aging operations.

The permanently sealing and the releasing of the pressing, which are performed after the compressively deforming, may be conducted so that the permanently sealing is performed first and then the releasing of the pressing (hereinafter, also referred to as the pressing releasing) is performed, or alternatively, the pressing releasing is performed first and then the permanently sealing is performed. However, it is preferable to perform the permanently sealing first and then the pressing releasing, because this process sequence allows the internal pressure to decrease in association with an increase in the inner volume of the case due to the spring back that occurs in the electrode body and the case at the time of releasing the pressing.

The manner of permanently sealing may include for example a method in which a through hole of the case is closed with a sealing member made of metal or with a sealing member made of metal and partially rubber, and the sealing member is welded to the case so as to disable release of sealing. An alternative sealing method is to close the through hole of the case with a blind rivet.

(2) In the method for producing a power storage device described in (1), furthermore, the electrode body may have properties that a dimension in the thickness direction increases as an SOC becomes higher, and the compressively deforming may be performed on the power storage device adjusted to 30% SOC or less.

In the above-described production method, the compressively deforming is performed on the power storage device with SOC 30% or less, that is, with a relatively small dimension of the electrode body in the thickness direction. Thus, the case side walls can be sufficiently recessed, or depressed, toward the electrode body, so that the completed power storage device can achieve the self-pressing of more strongly pressing the case side walls of against the electrode body.

(3) In the method for producing a power storage device described in (1) or (2), furthermore, the compressively deforming may be performed on the power storage device with the inside of the case is in communication with the outside.

In the above-described production method, the compressively deforming is performed on the power storage battery while the inside of the case is in communication with the outside. This can sufficiently compress the electrode body in the thickness direction, so that the gas that has been generated during the initial charging and the aging can be more appropriately pushed out of the electrode body and hence exhausted out of the case. In addition, since the case side walls are sufficiently recessed toward the electrode body, the completed power storage device can achieve the self-pressing of more strongly pressing the case side walls against the electrode body.

(4) In the method for producing a power storage device described in one of (1) to (3), furthermore, the electrode sheets of the electrode body may include: a positive electrode sheet including a positive active material layer containing positive active material particles; and a negative electrode sheet, and the positive active material particles may be lithium transition metal composite oxide particles having a composition in which Ni is contained at a ratio of 50% or more to the total amount of transition metals excluding Li.

In electrode bodies having positive electrode sheets including positive active material particles containing a large amount of Ni as described above, a large amount of gas tends to be generated during the initial charging and the aging. In the foregoing production method, however, even if a large amount of gas occurs during the initial charging and the aging, the case can be permanently sealed after the generated gas is pushed out of the electrode body and further exhausted out of the case by the above-described compressively deforming and permanently sealing processes. Therefore, a power storage device can be produced with less gas accumulating in the electrode body, even though including the positive electrode sheets made with positive active material particles containing a large amount of Ni.

DETAILED DESCRIPTION OF THE EXEMPLARY EMBODIMENTS

Figure 1:
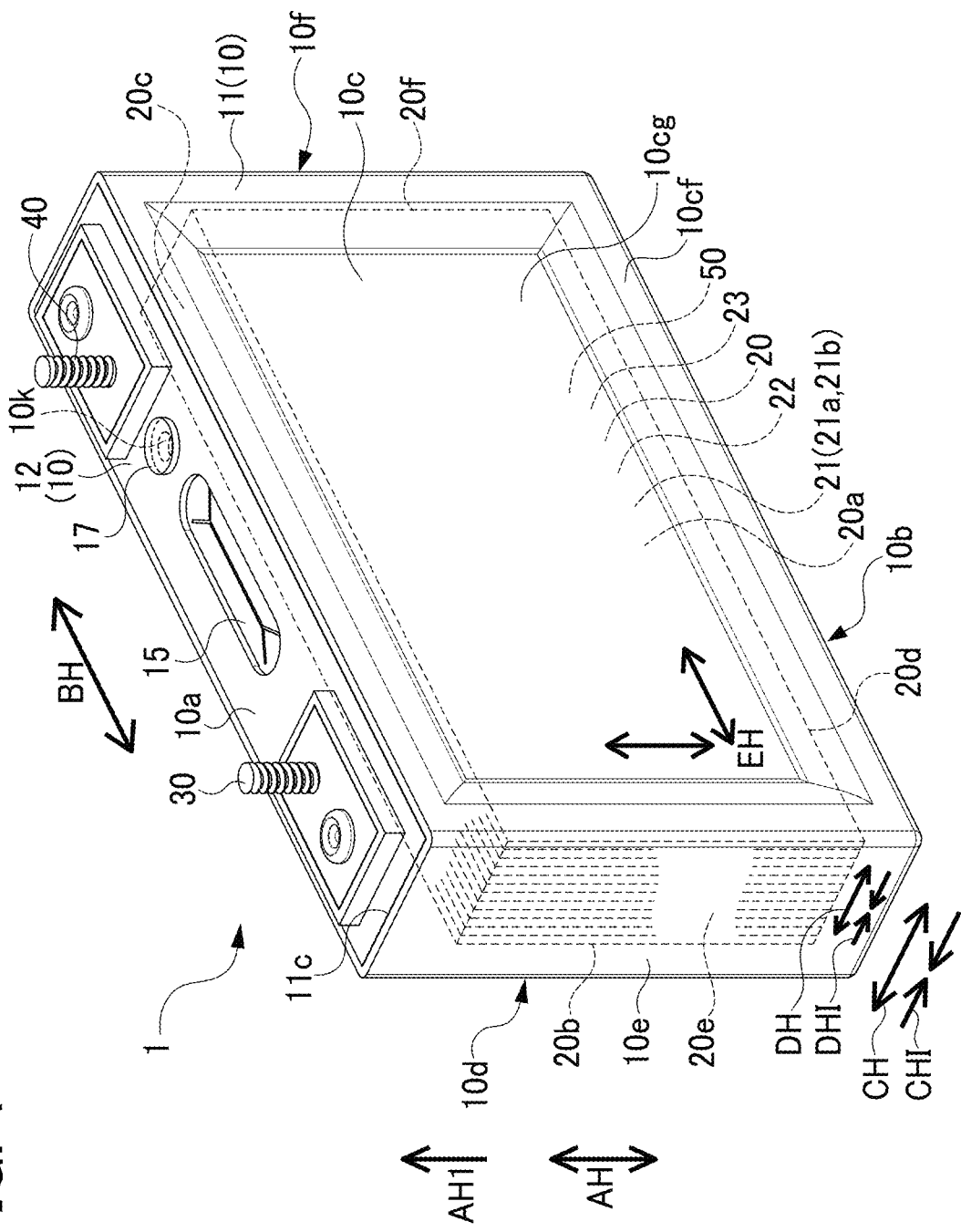
FIG. 1 is a perspective view of a battery in an embodiment.
Figure 2:
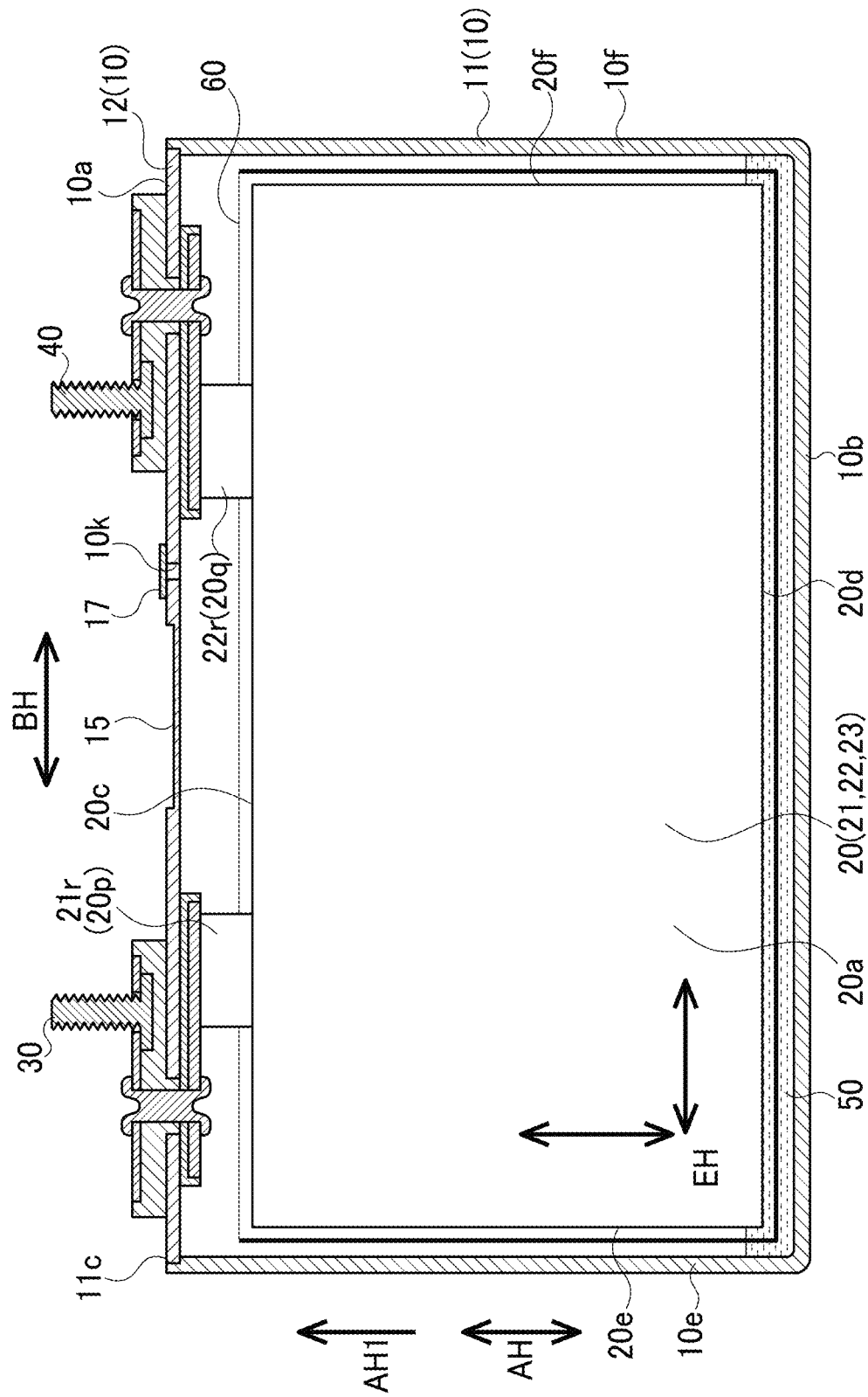
FIG. 2 is a cross-sectional view of the battery in a vertical direction and a lateral direction in the embodiment.

A detailed description of an embodiment of this disclosure will now be given referring to the accompanying drawings. FIG. 1 is a perspective view of a battery (one example of a power storage device of the present disclosure) 1 in the present embodiment. FIG. 2 is a cross-sectional view of the battery 1.

In the following description, the vertical direction AH and the thickness direction CH of the battery 1 are defined as indicated in FIGS. 1 and 2. This battery 1 is a rectangular sealed lithium-ion secondary battery, which can be mounted in a vehicle, such as a hybrid car, a plug-in hybrid car, and an electric vehicle.

The battery 1 includes a case 10, an electrode body 20 accommodated in the case 10, a positive terminal 30 and a negative terminal 40, each supported in the case 10, and other parts and components. In the case 10, the electrode body 20 is covered with a pouch-shaped insulation film 60 having an open end on one side AH1 in the battery vertical direction AH. In the case 10, further, an electrolytic solution 50 is contained, a part of which is impregnated in the electrode body 20 and another part of which stays on a case bottom wall 10b of the case 10. The electrolytic solution 50 is an electrolytic solution prepared by dissolving lithium hexafluorophosphate ($LiPF_6$) as supporting salt in a nonaqueous solvent mixture of ethylene carbonate (EC), dimethyl carbonate (DMC), and methyl ethyl carbonate (EMC).

The case 10 has a rectangular parallelepiped box-like shape, made of metal, e.g., aluminum in the present embodiment, which has a rectangular case top wall 10a, the case bottom wall 10b opposed to the case top wall 10a, and a pair of case long-side walls 10c and 10d (one example of case side walls of the present disclosure) and a pair of case short-side walls 10e and 10f, which are rectangular and connect the top wall 10a with the bottom wall 10b. The case long-side walls 10c and 10d respectively include peripheral edge portions 10cf and 10df, each having a rectangular frame-like shape, and rectangular central portions 10cg and 10dg. These central portions 10cg and 10dg are recessed inwardly, i.e., toward the inside CHI, in the battery thickness direction CH, that is, toward the electrode body 20, and thus located inside more than the peripheral edge portions 10cf and 10df. The central portions 10cg and 10dg of the case long-side walls 10c and 10d press against the electrode body 20 inwardly, i.e., toward the inside DHI, in the thickness direction DH of the electrode body 20.

This case 10 includes a case body 11 having a bottomed rectangular tubular shape with an opening 11c on one side AH1 in the battery vertical direction AH, i.e., on the upper side in FIG. 1, which forms the case bottom wall 10b, case long-side walls 10c and 10d, and case short-side walls 10e and 10f, and a case lid 12 having a rectangular plate shape welded to close the opening 11c of the case body 11 and forming the case top wall 10a.

In the case lid 12, a safety valve 15 is provided near the center in the battery lateral direction BH. The safety valve 15 can break and open if the internal pressure of the case 10 exceeds a valve opening pressure. The case lid 12 is further formed with a through hole 10k, which allows communication between the inside and the outside of the case 10 and is hermetically permanently sealed with a sealing member 17 having a circular disc shape and being made of metal, e.g., aluminum in the present embodiment. Specifically, the sealing member 17 is welded, over its entire circumference, to the case 10, i.e., the case lid 12 so that the through hole 10k is externally covered with the sealing member 17. This through hole 10k is used for injection of the electrolytic solution 50 into the case 10.

Furthermore, the case lid 12 is fixedly provided with the positive terminal composed of a plurality of aluminum members in an insulated state from the case lid 12. This positive terminal 30 is connected and electrically conductive, inside the case 10, to a positive electrode tab 20p (described later) of the electrode body 20, while extends out of the case 10 through the case lid 12. Further, the case lid 12 is fixedly provided with the negative terminal 40 composed of a plurality of copper members in an insulated state from the case lid 12. This negative terminal 40 is connected and electrically conductive, inside the case 10, to a negative electrode tab 20q (described later) of the electrode body 20, while extends out of the case 10 through the case lid 12.

The electrode body 20 is a laminated electrode body of a flat parallelepiped shape, including a plurality of rectangular positive electrode sheets 21 (electrode sheets) and a plurality of rectangular negative electrode sheets 22 (electrode sheets), which are alternately laminated, or stacked, with rectangular separators 23 interposed therebetween in the thickness direction DH. The separators 23 are formed of porous resin films. The positive electrode sheets 21 and the separators 23 laminated in the thickness direction DH are bonded to each other with adhesive. Similarly, the negative electrode sheets 22 and the separators 23 laminated in the thickness direction DH are bonded to each other with adhesive. The electrode body 20 is thus formed as an integrated body.

This electrode body 20 consists of six flat planes. In other words, the electrode body 20 includes a pair of electrode-body flat surfaces 20a and 20b, each extending over in the extending directions EH perpendicular to the thickness direction DH, and four electrode-body peripheral surfaces 20c, 20d, 20e, and 20f each joining the electrode-body flat surfaces 20a and 20b. In the battery 1, the one electrode-body flat surface 20a of the electrode body 20 faces the one case long-side wall 10c of the case 10 and the other electrode-body flat surface 20b faces the other case long-side wall 10d. Further, the electrode-body peripheral surface 20c faces the case top wall 10a and the electrode-body peripheral surface 20d faces the case bottom wall 10b. The electrode-body peripheral surface 20e faces the case short-side wall 10e and the electrode-body peripheral surface 20f faces the case short-side wall 10f.

The positive electrode sheets 21 each have a positive current collecting foil (not shown) formed of a rectangular aluminum foil provided, on each main surface, with a positive active material layer 21a. The positive active material layers 21a each consist of positive active material particles 21b that can absorb and release lithium ions, conductive particles, and a binding agent. The positive active material particles 21b are lithium transition metal composite oxide particles containing Ni at a ratio of 50 mol % or more to the total amount of transition metals excluding Li. In the present embodiment, the positive active material particles 21b are lithium nickel cobalt manganese composite oxide, specifically, $LiNi_{0.6}Co_{0.2}Mn_{0.2}O_2$ particles containing Ni at a ratio of 60 mol % to the total amount of transition metals (Ni, Co, and Mn). Each positive electrode sheet 21 has an extended portion extending on the one side AH1 in the battery vertical direction AH, which is a positive-electrode exposed portion 21r formed of the positive current collecting foil exposed in the thickness direction DH without including the positive active material layers 21a in the thickness direction DH. The positive-electrode exposed portions 21r of the positive electrode sheets 21 overlap one another in the thickness direction DH, forming the positive electrode tab 20p. This positive electrode tab 20p is connected to the positive terminal 30 as mentioned above.

The negative electrode sheets 22 each have a negative current collecting foil (not shown) formed of a rectangular copper foil provided, on each main surface, with a negative active material layer (not shown). The negative active material layers each consist of negative active material particles that can absorb and release lithium ions, a binder agent, and a thickening agent. Each negative electrode sheet 22 has an extended portion extending on the one side AH1 in the battery vertical direction AH, which is a negative-electrode exposed portion 22r formed of the negative current collecting foil exposed in the thickness direction DH without including the negative active material layers in the thickness direction DH. The negative-electrode exposed portion 22r of the negative electrode sheets 22 overlap one another in the thickness direction DH, forming the negative electrode tab 20q. This negative electrode tab 20q is connected to the negative terminal 40 as mentioned above.

Figure 3:
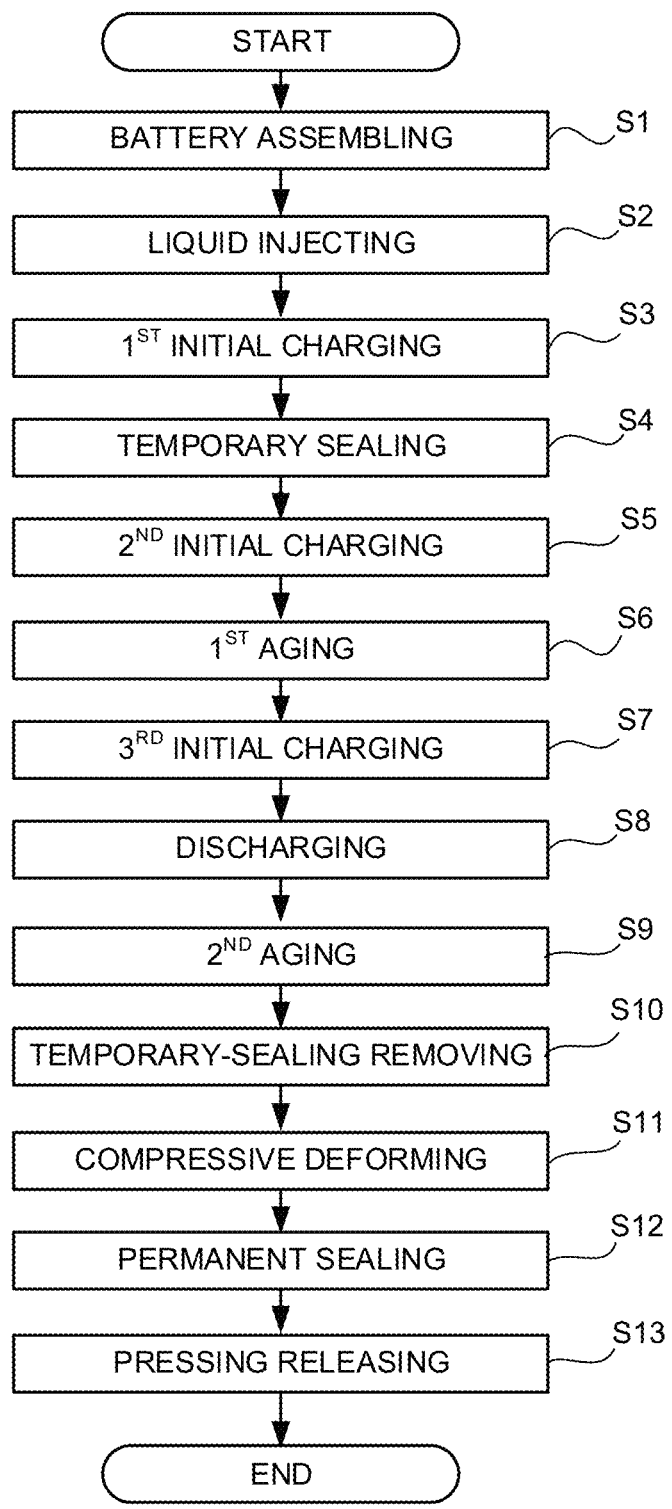
FIG. 3 is a flowchart of a method for producing the battery in the embodiment.

A method for producing the battery 1 configured as above will be described below, referring to FIG. 3. In a battery assembling step S1, a battery 1 is first assembled with no liquid injected. Specifically, the positive electrode sheets 21, the negative electrode sheets 22, and the separators 23 are laminated to form the electrode body 20. Then, the positive terminal 30 and the negative terminal 40 are fixed to the case lid 12, and further the positive terminal 30 and the negative terminal 40 are respectively connected to the positive electrode tab 20p and the negative electrode tab 20q of the electrode body 20 by welding. Subsequently, the electrode body 20 is enclosed in the pouch-shaped insulation film 60. The electrode body 20 covered with the insulation film 60 is inserted in the case body 11 and then the opening 11c of the case body 11 is closed with the case lid 12. These case body 11 and case lid 12 are welded over the entire circumference of the case lid 12 to finish the case 10. Thus, the battery 1 containing no liquid is made up.

In a liquid injecting step S2, the electrolytic solution 50 is injected in the case 10 through the through hole 10k. The battery 1 is let stand for a predetermined time so that the electrolytic solution 50 permeates the electrode body 20.

In a first initial charging step S3, the battery 1 is subjected to first initial charging. In the present embodiment, the initial charging is performed in three separate stages as described later. Specifically, the battery 1 is connected to a charge device (not shown) and charged to 10% SOC by constant current (CC) charging under an environmental temperature of 25° C. At that time, a part of the electrolytic solution 50 is decomposed inside the electrode body 20, generating gas GA, such as hydrogen gas. Most of the generated gas GA discharged out of the electrode body 20 into the case 10 is further exhausted out of the case 10 through the through hole 10k. However, the electrode body 20 is not being pressed in the thickness direction DH and thus the gas GA generated in the electrode body 20 partially accommodates in the electrode body 20.

In a temporary sealing step S4, subsequently, the through hole 10k of the case 10 is closed with a temporary sealing member (not shown) formed of a rubber stopper to hermetically temporarily seal the case 10. This temporary sealing is to prevent air from entering in the case 10 of the battery 1 throughout subsequent steps; a second initial charging step S5 to a second aging step S9.

In the second initial charging step S5, the battery 1 is subjected to second initial charging. Specifically, the temporarily sealed battery 1 is connected to the charge device (not shown) and charged to 35% SOC by constant current (CC) charging under an environmental temperature of 25° C. In this second initial charging step S5 and the following first aging step S6, a part of the electrolytic solution 50 is decomposed inside the electrode body 20, generating gas GA, such as hydrogen gas. In the above steps, however, the case 10 is temporarily sealed, so that the generated gas GA is not exhausted out of the case 10, and remains staying in the case 10. Further, the electrode body 20 is not being pressed in the thickness direction DH and therefore the gas GA generated in the electrode body 20 partially remains in the electrode body 20.

In a first aging step S6, the battery 1 is subjected to high-temperature aging in which the battery 1 adjusted to 35% SOC as above is left still standing for 12 hours with the terminals open under an environmental temperature of 60° C.

In a third initial charging step S7, the battery 1 is subjected to third initial charging. Specifically, the battery 1 is connected to a charge-discharge device, and charged to 100% SOC by constant current constant voltage (CCCV) charging under an environmental temperature of 25° C. Then, the charging is paused for 1 minute. In this third initial charging step S7 and the second aging step S9 mentioned later, a part of the electrolytic solution 50 is decomposed inside the electrode body 20, generating gas GA, such as hydrogen gas. In these steps, however, the case 10 is temporarily sealed and thus the generated gas GA is not exhausted out of the case 10, but remains staying in the case 10. Further, the electrode body 20 is not being pressed in the thickness direction DH and therefore the gas GA generated in the electrode body 20 partly remains in the electrode body 20.

In a discharging step S8, the battery 1 is discharged. Specifically, the battery 1 is discharged to 0% SOC by constant current (CC) discharging.

In the following second aging step S9, the battery 1 is subjected to high-temperature aging in which the battery 1 adjusted to 0% SOC as above is left still standing for 12 hours with the terminals open under an environmental temperature of 60° C.

In a step S10 of removing the temporary sealing (which will be referred to as a temporary-sealing removing step S10), under a nitrogen atmosphere, the temporary sealing member (for example, the rubber stopper not shown) that closes the through hole 10k of the battery 1 is removed, allowing the inside of the case 10 to communicate with the outside through the through hole 10k. Accordingly, most of the gas GA having stayed in the case 10 is exhausted out of the case 10 through the through hole 10k. However, the gas GA accumulating in the electrode body 20 remains left in the electrode body 20.

Figure 4:
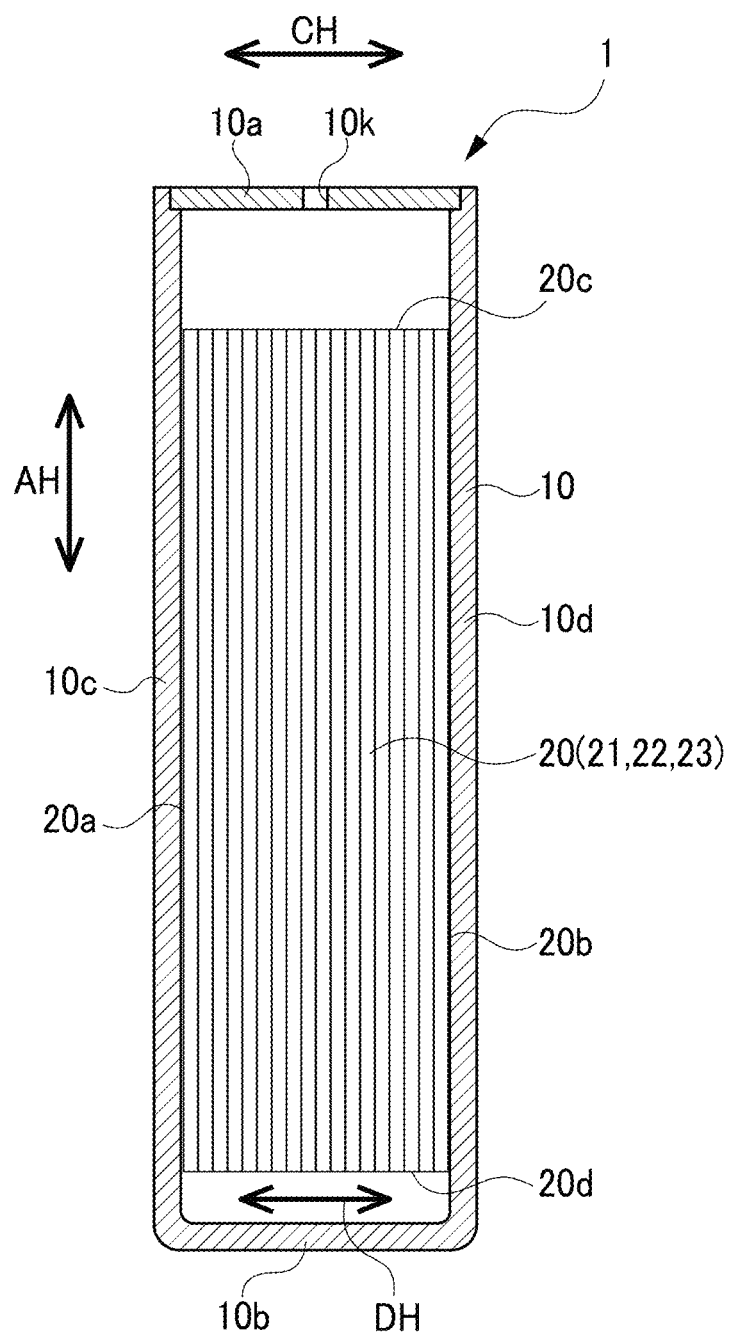
FIG. 4 is an explanatory view showing a battery just before a compressive deforming step in the embodiment.
Figure 5:
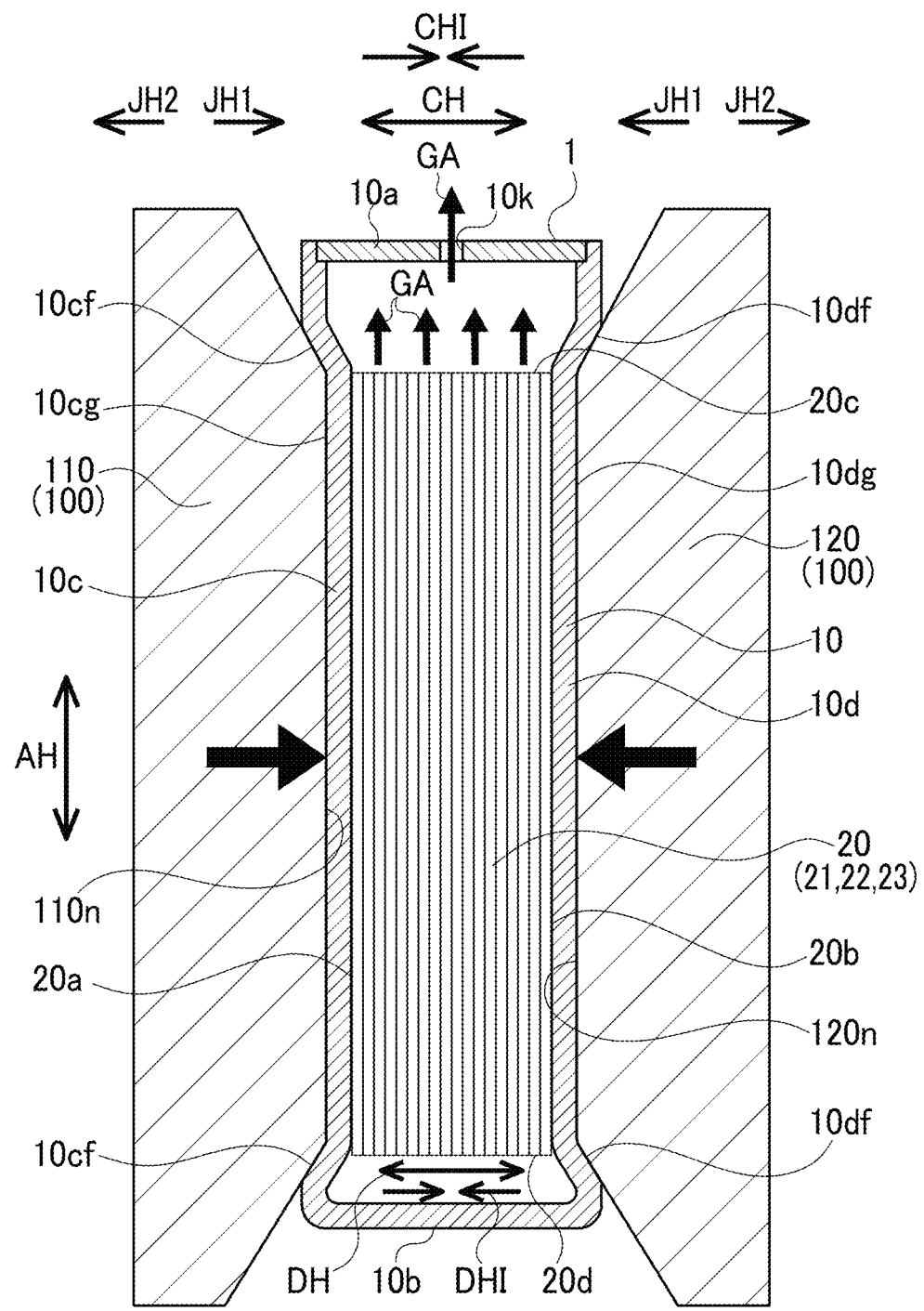
FIG. 5 is an explanatory view showing the battery pressed in the compressive deforming step in the embodiment.

Subsequently, a compressive deforming step S11 is performed. FIG. 4 shows the battery 1 just before the compressive deforming step S11. FIG. 5 shows the battery 1 pressed in the compressive deforming step S11. In FIGS. 4 and 5, the positive terminal 30, the negative terminal 40, and others are omitted for simplification of the figures.

In this compressive deforming step S11, using a press device 100, the pair of case long-side walls 10c and 10d of the case 10 of the battery 1 in an unsealed state are pressed against the electrode body 20. Accordingly, the electrode body 20 interposed between the pair of case long-side walls 10c and 10d is compressed inwardly, i.e., toward the inside DHI, in the thickness direction DH and also the pair of case long-side walls 10c and 10d are each plastically deformed to be recessed toward the inside CHI in the battery thickness direction CH, i.e., toward the electrode body 20. In this step, the case long-side walls 10c and 10d are sufficiently plastically deformed toward the electrode body 20 so that the pair of case long-side walls 10c and 10d continue to press against the electrode body 20 toward the inside DHI in the thickness direction DH even after the pressing by the press device 100 is released in a following step S13 of releasing the pressing (which will be referred to as a pressing releasing step S13). This compressive deforming step S11 is performed under the nitrogen atmosphere to prevent air from entering in the case 10 of the battery 1.

The press device 100 is provided with two metallic pressing members 110 and 120, which face each other, and a movement mechanism (not shown) for moving the pressing members 110 and 120 in an approaching direction JH1 in which those pressing members 110 and 120 come close to each other and in a separating direction JH2 in which those pressing members 110 and 120 come apart from each other. The pressing members 110 and 120 respectively include pressing surfaces 110n and 120n, facing each other and each having dimensions that are smaller than the dimensions of each of the case long-side walls 10c and 10d of the battery 1 in the battery vertical direction AH and the battery lateral direction BH and nearly equal to the dimension s of each of the electrode-body flat surfaces 20a and 20b of the electrode body 20 in the battery vertical direction AH and the battery lateral direction BH.

In the compressive deforming step S11, firstly, the battery 1 adjusted to 30% SOC or less (e.g., 0% SOC in the present embodiment) in the discharging step S8 is put between the two pressing members 110 and 120 of the press device 100. Specifically, the battery 1 is placed so that the case long-side wall 10c of the battery 1 faces the pressing surface 110n of the pressing member 110 and the case long-side wall 10d of the battery 1 faces the pressing surface 120n of the pressing member 120. Using the movement mechanism (not shown) of the press device 100, subsequently, the two pressing members 110 and 120 are moved in the approaching direction JH1 to come close to each other, so that the pressing surface 110n of the pressing member 110 on one side contacts the case long-side wall 10c of the battery 1 and also the pressing surface 120n of the pressing member 120 on the other side contacts the case long-side wall 10d, sandwiching the battery 1 between the two pressing members 110 and 120.

The two pressing members 110 and 120 are further moved in the approaching direction JH1 to press the case long-side walls 10c and 10d toward the inside CHI in the battery thickness direction CH, thereby compressing the electrode body 20 toward the inside DHI in the thickness direction DH, and plastically deforming the case long-side walls 10c and 10d to be recessed toward the inside CHI in the battery thickness direction CH so that the central portions 10cg and 10dg of the case long-side walls 10c and 10d are located on the inside CHI in the battery thickness direction CH. In the present embodiment, the case long-side walls 10c and 10d are pressed with a pressure of 200 kPa. Accordingly, even after the pressing by the press device 100 is released in the following pressing releasing step S13, the pair of case long-side walls 10c and 10d continue the self-pressing by pressing themselves against the electrode body 20 in the thickness direction DH.

Since the electrode body 20 is compressed in the thickness direction DH in the above step, most of the gas GA having accumulated in the electrode body 20 is pushed out of the electrode body 20. Most of the pushed-out gas GA is further exhausted out of the case 10 through the through hole 10k.

The electrode body 20 in the present embodiment has properties that the dimension in the thickness direction DH increases as the SOC becomes higher. In the present embodiment, however, the compressive deforming step S11 is performed on the battery 1 adjusted to 0% SOC. In other words, the compressive deforming step S11 is conducted for the electrode body 20 having a small dimension in the thickness direction DH. Thus, the case long-side walls 10c and 10d can be sufficiently recessed, or depressed, toward the electrode body 20.

In addition, the compressive deforming step S11 is performed on the battery 1 in the unsealed state, i.e., with the inside of the case 10 communicating with the outside. This process can sufficiently compress the electrode body 20 in the thickness direction DH, appropriately pushing out gas GA from the inside of the electrode body 20, further exhausting the gas GA out of the case 10. Furthermore, the case long-side walls 10c and 10d can be sufficiently pressed inwardly, i.e., recessed toward the electrode body 20.

In a permanent sealing step S12, the battery 1 in the unsealed state as above, i.e., with the inside of the case 10 communicating with the outside, undergoes permanent sealing of hermetically permanently seal the case 10. In the present embodiment, this permanent sealing step S12 is performed on the battery 1 that is held under pressure by the press device 100. Specifically, the through hole 10k is covered with the metallic sealing member 17 and further this sealing member 17 is welded, over its entire circumference, to the case 10, thus making a hermetical and unreleasable seal between the sealing member 17 and the case 10.

In the pressing releasing step S13, the pressing applied to the battery 1 by the press device 100 is released. Specifically, using the movement mechanism (not shown) of the press device 100, the two pressing members 110 and 120 are moved in the separating direction JH2 to separate from the battery 1. Thereafter, the battery 1 is taken out of the press device 100. Since the pair of case long-side walls 10c and 10d have been plastically deformed as above, the case 10 continues the self-pressing of pressing the case long-side walls 10c and 10d themselves against the electrode body in the thickness direction DH even after the pressing of the press device 100 is released. Consequently, during use of the battery 1 after shipment, even if gas GA is generated inside the electrode body 20, this gas GA is easily discharged out of the electrode body 20 under the pressing and hence is less likely to accumulate inside the electrode body 20.

In the present embodiment, the permanent sealing step S12 is performed first, followed by the pressing releasing step S13. Consequently, the internal pressure of the case 10 and the internal pressure of the electrode body 20 also decrease in association with an increase in the volume of the case 10 due to spring back that occurs in the electrode body 20 and the case 10 at the time of releasing the pressing. Thus, the battery 1 is completed.

In the method for producing the power storage device 1 in the present embodiment, after the first initial charging step S3, second initial charging step S5, first aging step S6, third initial charging step S7, and second aging step S9, the battery 1 that has not been permanently sealed yet undergoes the compressive deforming step S11. After that, while the battery 1 is held in a pressed state as in the compressive deforming step S11, the case 10 of the power storage device 1, in which the inside of the case 10 is in communication with the outside, is permanently sealed (the permanent sealing step S12). Accordingly, the case 10 can be hermetically permanently sealed in such a state where the gas GA generated inside the electrode body 20 during those first initial charging step S3, second initial charging step S5, first aging step S6, third initial charging step S7, and second aging step S9 has been pushed out of the electrode body 20 and further exhausted out of the case 10. This method therefore can produce the battery 1 with less gas GA accumulating in the electrode body 20. In addition, since the completed battery 1 continues the self-pressing by pressing the pair of case long-side walls 10c and 10d against the electrode body 20, even if gas GA is generated inside the electrode body 20 during use of the battery 1 after shipment, this gas GA is easily discharged out of the electrode body 20 under the pressing and hence the gas GA is less likely to accumulate in the electrode body 20.

In the present embodiment, moreover, the compressive deforming step S11 is performed on the battery 1 with the 30% SOC or less (concretely, 0% SOC), in which the dimension of the electrode body 20 is small in the thickness direction DH. Thus, the case long-side walls 10c and the 10d can be sufficiently recessed, or depressed, toward the electrode body 20. Consequently, the completed battery 1 can achieve the self-pressing of more strongly pressing the case long-side walls 10c and 10d against the electrode body 20.

Since the compressive deforming step S11 is performed with the inside of the case 10 communicating with the outside, the electrode body 20 can be sufficiently compressed in the thickness direction DH, thereby pushing out the gas GA from the electrode body 20 more appropriately, thus exhausting the gas GA out of the case 10. Further, since the case long-side walls 10c and 10d can be sufficiently recessed toward the electrode body 20, consequently, the completed battery 1 can achieve the self-pressing of more strongly pressing the case long-side walls 10c and 10d against the electrode body 20.

In the electrode body 20 including the positive electrode sheets 21 made of lithium transition metal composite oxide particles having a composition in which Ni is contained at a ratio of 50 mol % or more to the total amount of transition metals excluding Li, a large amount of gas GA tends to be generated. However, even if a large amount of gas GA is generated, the case 10 can be permanently sealed after the gas GA is discharged out of the electrode body 20 and hence out of the case 10 in the compressive deforming step S11 and the permanent sealing step S12. Consequently, the battery 1 can be produced with less gas GA accumulating in the electrode body 20, even though including the positive electrode sheets 21 made with the positive active material particles 21b containing a large amount of Ni.

The present disclosure is described as above in the embodiments, but is not limited thereto. The present disclosure may be embodied in other specific forms without departing from the essential characteristics thereof.

In the embodiments, for example, the temporary sealing step S4 is performed after the first initial charging step S3, and the temporary-sealing removing step S10 is performed after the second aging step S9. As an alternative, those temporary sealing step S4 and temporary-sealing removing step S10 may be omitted so that the second initial charging step S5 to the second aging step S9 are performed while the inside of the case 10 is held in communication with the outside.

In the present embodiment, the temporary-sealing removing step S10 is performed before the compressive deforming step S11, and the permanent sealing step S12 is conducted after the compressive deforming step S11. As an alternative, the temporary-sealing removing step S10 may be performed after the compressive deforming step S11, and successively the permanent sealing step S12 may be performed.

In the present embodiment, after the compressive deforming step S11, the permanent sealing step S12 and the pressing releasing step S13 are performed in this order. To the contrary, after the compressive deforming step S11, the pressing releasing step S13 and the permanent sealing step S12 may be performed in this order.

REFERENCE SIGNS LIST

1 Battery (Power storage device)
10 Case
10c, 10d Case long-side wall (Case side wall)
10k Through hole
17 Sealing member
20 Electrode body
20a, 20b Electrode-body flat surface
21 Positive electrode sheet (Electrode sheet)
21a Positive active material layer
21b Positive active material particles
22 Negative electrode sheet (Electrode sheet)
23 Separator
50 electrolytic solution
100 Press device
DH Thickness direction (of electrode body)
EH Extending direction (of electrode-body flat surface)
S3 First initial charging step
S5 Second initial charging step
S6 First aging step
S7 Third initial charging step
S9 Second aging step
S11 Compressive deforming step
S12 Permanent sealing step
S13 Pressing releasing step

What is claimed is:

1. A method for producing a power storage device, the power storage device comprising:
    an electrode body having a pair of electrode body flat surfaces and including a plurality of electrode sheets laminated in a thickness direction perpendicular to an extending direction of the flat surfaces;
    an electrolytic solution;
    a case that has a pair of case side walls each facing one of the electrode flat surfaces and accommodates the electrode body and the electrolytic solution,
wherein the method comprises:
    (a) compressively deforming including pressing the pair of case side walls of the case against the electrode body after the power storage device is subjected to initial charging and aging but before permanent sealing, to:
        compress the electrode body interposed between the pair of case side walls in the thickness direction; and
        plastically deform at least one of the pair of case side walls to be recessed toward the electrode body so that the pair of case side walls continue to press the electrode body in the thickness direction even after releasing the pressing;
    after the compressively deforming,
    (b) hermetically permanently sealing the case of the power storage device in which inside of the case is in communication with outside; and
    (c) releasing the pressing on the power storage device applied in the compressively deforming.

2. The method for producing a power storage device according to claim 1, wherein
    the electrode sheets of the electrode body include:
        a positive electrode sheet including a positive active material layer containing positive active material particles; and
        a negative electrode sheet, and
    the positive active material particles are lithium transition metal composite oxide particles having a composition in which Ni is contained at a ratio of 50% or more to the total amount of transition metals excluding Li.

3. The method for producing a power storage device according to claim 1, wherein the compressively deforming is performed on the power storage device with the inside of the case is in communication with the outside.

4. The method for producing a power storage device according to claim 3, wherein
    the electrode sheets of the electrode body include:
        a positive electrode sheet including a positive active material layer containing positive active material particles; and
        a negative electrode sheet, and
    the positive active material particles are lithium transition metal composite oxide particles having a composition in which Ni is contained at a ratio of 50% or more to the total amount of transition metals excluding Li.

5. The method for producing a power storage device according to claim 1, wherein
the electrode body has properties that a dimension in the thickness direction increases as an SOC becomes higher, and
the compressively deforming is performed on the power storage device adjusted to 30% SOC or less.

6. The method for producing a power storage device according to claim 5, wherein
the electrode sheets of the electrode body include:
a positive electrode sheet including a positive active material layer containing positive active material particles; and
a negative electrode sheet, and
the positive active material particles are lithium transition metal composite oxide particles having a composition in which Ni is contained at a ratio of 50% or more to the total amount of transition metals excluding Li.

7. The method for producing a power storage device according to claim 5, wherein the compressively deforming is performed on the power storage device with the inside of the case is in communication with the outside.

8. The method for producing a power storage device according to claim 7, wherein
the electrode sheets of the electrode body include:
a positive electrode sheet including a positive active material layer containing positive active material particles; and
a negative electrode sheet, and
the positive active material particles are lithium transition metal composite oxide particles having a composition in which Ni is contained at a ratio of 50% or more to the total amount of transition metals excluding Li.

* * * * *